(12) United States Patent
Pijlman

(10) Patent No.: US 9,958,692 B2
(45) Date of Patent: May 1, 2018

(54) MULTIVIEW DISPLAY DEVICE

(71) Applicant: KONINKLIJKE PHILIPS N.V., Eindhoven (NL)

(72) Inventor: Fetze Pijlman, Eindhoven (NL)

(73) Assignee: KONINKLIJKE PHILIPS N.V., Eindoven (NL)

( * ) Notice: Subject to any disclaimer, the term of this patent is extended or adjusted under 35 U.S.C. 154(b) by 0 days. days.

(21) Appl. No.: 15/258,016

(22) Filed: Sep. 7, 2016

(65) Prior Publication Data

US 2016/0377877 A1 Dec. 29, 2016

Related U.S. Application Data

(63) Continuation of application No. 13/503,413, filed as application No. PCT/IB2010/054407 on Sep. 30, 2010, now Pat. No. 9,448,459.

(30) Foreign Application Priority Data

Oct. 30, 2009 (EP) ..................................... 09174563
May 19, 2010 (EP) ..................................... 10163323

(51) Int. Cl.
*G02F 1/29* (2006.01)
*G02B 27/22* (2018.01)
(Continued)

(52) U.S. Cl.
CPC ........... *G02B 27/2214* (2013.01); *G02F 1/29* (2013.01); *H04N 13/0404* (2013.01);
(Continued)

(58) Field of Classification Search
CPC ... G02B 27/2214; G02F 1/29; G02F 2202/40; G02F 2001/294; G02F 2203/22; H04N 13/0404
(Continued)

(56) References Cited

U.S. PATENT DOCUMENTS 4,859,027 A 8/1989 Kishida
6,014,197 A 1/2000 Hikmet
(Continued)

FOREIGN PATENT DOCUMENTS

EP 0874269 A1 10/1998
EP 1750459 A2 2/2007
(Continued)

*Primary Examiner* — Tuyen Tra

(57) ABSTRACT

The invention provides an autostereoscopic display device having an adjuster for adjusting the direction of a light beam (5). The adjuster (1) has an off-state and on-state and comprises a stack (10) of layers. The stack (10) comprises a first solid material layer (100) having a first optic axis (111), a second solid material layer (200) having a second optic axis (211), and switchable birefringent twisted nematic liquid crystal material (30) or chiral nematic liquid crystal material. Further, the stack includes a first interface (130) between the first solid material layer (100) and birefringent material (30) and a second interface (230) between the second solid material layer (200) and birefringent material (30). In the off-state, the birefringent material (30) at the first interface (130) is configured to have an optic axis parallel to the first optic axis (111) and the birefringent material (30) at the second interface (230) is configured to have an optic axis parallel to the second optic axis (211). In the on-state, the birefringent material (30) at the first interface (130) is configured to have an optic axis perpendicular to the first optic axis (111) and the birefringent material (30) at the second interface (230) is configured to have an optic axis perpendicular to the second optic axis (211).

20 Claims, 9 Drawing Sheets

(51) Int. Cl.
*H04N 13/04* (2006.01)
*F21V 14/00* (2018.01)

(52) U.S. Cl.
CPC ...... *F21V 14/003* (2013.01); *G02F 2001/294* (2013.01); *G02F 2202/40* (2013.01); *G02F 2203/22* (2013.01)

(58) Field of Classification Search
USPC ....... 359/316, 376, 455, 458, 462, 619, 621, 359/625, 315; 345/690
See application file for complete search history.

(56) References Cited

U.S. PATENT DOCUMENTS

| | | | |
|---|---|---|---|
| 6,064,424 A | 5/2000 | Van Berkel | |
| 6,069,650 A | 5/2000 | Battersby | |
| 6,533,420 B1* | 3/2003 | Eichenlaub | ........ G02B 27/2214 348/E13.029 |
| 2001/0050734 A1 | 12/2001 | Cornelissen | |
| 2007/0008617 A1 | 1/2007 | Shestak | |
| 2007/0035672 A1* | 2/2007 | Shestak | .............. G02B 27/2214 349/15 |
| 2008/0117506 A1 | 5/2008 | Choi | |

FOREIGN PATENT DOCUMENTS

| | | |
|---|---|---|
| GB | 2389192 A | 12/2003 |
| WO | 2004016460 A1 | 2/2004 |
| WO | 2004059565 A1 | 7/2004 |
| WO | 2004070467 A2 | 8/2004 |
| WO | 2007049213 A2 | 5/2007 |
| WO | 2007099488 A1 | 9/2007 |

* cited by examiner

MULTIVIEW DISPLAY DEVICE

CROSS REFERENCE TO RELATED APPLICATIONS

This application is a continuation of U.S. Ser. No. 13/503,413 filed Apr. 23, 2012 which is a U.S. national phase application of International Application No. PCT/IB2010/054407 filed Sep. 30, 2010 which claims the benefit of EP Applications Serial No. 09174563.8 filed Oct. 30, 2009 and 10163323.8 filed May 19, 2010 all of which are incorporated herein by reference.

FIELD OF THE INVENTION

The invention relates to Multi-view displays such as autostereoscopic or dual-view displays, which use an adjuster for adjusting the direction of light beams from a display panel.

BACKGROUND OF THE INVENTION

US 2007/0008617 discloses a 2D/3D switchable autostereoscopic display device in which a switchable lenticular arrangement has two lens sheets, with first and second electro-optical mediums between the sheets, with a half wave plate between.

SUMMARY OF THE INVENTION

According to the invention, there is provided a multi-view display device as defined in the independent claims. The dependent claims provide advantageous embodiments.

In this arrangement, the adjuster is configured to be able to adjust the direction of the beam of light ("light beam" or "beam") generated by a light source. In general, the adjuster is arranged to intercept the beam of light (when the light source is switched on). In at least one of the states, the adjuster is at least partially transmissive for at least part of the light generated by the light source to which the adjuster is arranged. Preferably, in both the on and off states, the adjuster is at least partially transmissive for at least part of the light generated by the light source to which the adjuster is arranged. The phrase "for adjusting the direction of a light beam" especially indicates that when the adjuster is switched on, the light beam adjusts the beam of light. When the adjuster is switched off, the light beam may pass the adjuster in an embodiment substantially unchanged.

The phrase "having an off-state and an on-state" indicates that the adjuster is configured to have a least two states, which are specified herein further. In the off-state, the light beam may pass the adjuster without being substantially influenced by the adjuster. In the on-state, the beam is at least partly manipulated by the adjuster. Note that the term "on-state" may refer to a plurality of on-states. Depending upon the conditions (such as voltage) applied to the birefringent material, different on-states, and thus different manipulations of the light beam may be obtained. In this way, a user may manipulate the beam dependent upon the desires of the user. Further herein, the "on-state" is used for a specific state that at least may be provided by the adjuster when switched on. Thus, intermediate states between the off-state and the specifically defined on-state may also be selectable for the adjuster.

The term "stack of layers" refers to substantially adjacent layers (see further also below). This does not exclude that the interfaces between two adjacent layers may have one or more curves or one or more angles. Especially, the interfaces between the solid birefringent material layer and the switchable birefringent material may comprise one or more microstructures such as prism structures. Preferably the interfaces are non-planar. The external faces of the first and the second material layers are however preferably arranged substantially parallel. These faces are preferably planer, whereas the layers at the interfaces with the switchable birefringent material are (thus) preferably substantially non-planar and comprise one or more microstructures.

The first interface and the second interface preferably have the shape of a plurality of lenses or prisms. The lenses may be directly adjacent, but there may also be a non-zero distance between the lenses or prisms. Preferably, the shapes of the lenses or prisms are substantial mirror images of each other.

Hence, preferably, in an embodiment the first interface and the second interface have the shape of a plurality of 1D lenses.

The arrangement of lenses is used to define a switchable lenticular imaging arrangement of a multi-view display device, such as an autostereoscopic or dual-view display device. For the autostereoscopic display preferably an array of lenses is used as this enables more than 3 views.

The multi-view display device may be an autostereoscopic display device. Such a device is capable of providing at least one viewer with a three dimensional (3D) image. In this case in the on state, the multi-view mode is a 3D mode, while in the off state the single view mode may be a 2D mode. Alternatively, the multi-view display device may be a dual-view display device. In this case in the on state the multi-view mode is for providing at least two different 2D images to at least two viewers. Thus e.g. the dual-view display may be in effect a triple view display capable of providing three different 2D images to three viewers. The single view mode may be for providing a single two-dimensional image.

The term image comprises still image, static image or video display of any kind.

This switchable lenticular lens arrangement is suitable for use with an OLED display panel which generates the light beams. This has unpolarized light output, but the adjuster design does not require a polarized light input. It may operate without light of the OLED display panel being lost or having to be discarded. In general display panels that provide unpolarized light may be used without loss of effect.

The first and the second solid material layers preferably comprise solid materials that are birefringent. The term "solid birefringent material" relates to a birefringent material of which the optic axis alignment is not variable, as is the case for the switchable birefringent material. Birefringence, or double refraction, is the decomposition of a ray of light into two rays (the ordinary ray and the extraordinary ray) when it passes through certain types of material depending on the polarization of the light. This effect can occur only if the structure of the material is anisotropic (directionally dependent). If the material has a single axis of anisotropy or optic axis (i.e. it is uniaxial), birefringence can be formalized by assigning two different refractive indices to the material that are commonly called ordinary refractive index and extra-ordinary refractive index.

The term optic axis is known in the art and relate to a direction at a position in an uniaxial medium such that all ordinary rays passing that position have polarization that is perpendicular to it. Often, the optic axis is close to the director of the molecules in case of a liquid crystal. See further, Hecht (Optics, 4th edition, E. Hecht, Addison-Wesley).

Examples of suitable materials for the first and the second material layers are for instance based on LC's such as RMM34c or RMM257 LC from Merck, that are included in a photopolymerized system. Such systems are for instance described in WO2004059565 and are known to the person skilled in the art.

In the "off-state" for each interface the media on both sides of the interface may give rise to a refractive index that is substantially the same on both sides of the interface for unpolarized light being aligned to a normal of the stack (off-state).

The switchable (birefringent) medium at each of the two interfaces can be switched to a state called "on-state" where for the first interface the media on both sides of the interface may give rise to a refractive index that is substantially the same on both sides of the interface for light being aligned to a normal of the stack and having a polarization in a second direction being either aligned or perpendicular to the first direction and give rise to a refractive index that is substantially different on both sides of the interface for light being aligned to a normal of the stack and having a polarization in a direction that is perpendicular to the second direction, and where for the second interface the media on both sides of the interface give rise to a refractive index that is substantially the same on both sides of the interface for light being aligned to a normal of the stack and having a polarization in a third direction being either aligned or perpendicular to the first direction and give rise to a refractive index that is substantially different on both sides of the interface for light being aligned to a normal of the stack and having a polarization in a direction that is perpendicular to the third direction.

The stack comprises a stack of the first solid material layer, a layer of switchable birefringent material, and the second solid material layer. The first optic axis and the second optic axis are preferably perpendicular. Such adjuster essentially consists of three layers, wherein the first and second solid material layers sandwich the switchable birefringent material. The switchable birefringent comprises twisted nematic liquid crystal or chiral nematic liquid crystal material. Further, the first optic axis and the second optic axis may be oriented in a plane of the stack.

This arrangement provides a simple construction and requires only one set of electrodes for switching. The use of a single switchable layer enables a thin construction, which means that the different polarizations experience reduced path differences resulting from the different depths at which refraction takes place.

In the off-state, the optic axis of the switchable birefringent material at the first interface is perpendicular to the optic axis of the same switchable material at the second interface. By for instance using twisted nematic liquid crystal, a twist of substantially 90° may be imposed to the optic axis of the switchable material over the material layer.

In the on-state, the optic axis (or optic axes) of the birefringent material in the layer of switchable birefringent material changes to a state wherein the optic axis is perpendicular to both the optic axis if the first solid material layer and the optic axis of the second material layer. In the on-state, the optic axes within the switchable material are substantially all aligned. An advantage of this embodiment is that relatively simple adjuster can be obtained with three layers only.

As known in the art, for alignment of liquid crystals one may use standard polyimide layers that are rubbed for orienting the LC close to the surface. Electric fields can be used for imposing a second orientation of the LC. For generating electric fields (transparent indium tin oxide (ITO) electrodes may be applied. Hence, the term "stack of layers" refers to substantially adjacent layers where between two substantially adjacent layers also an ITO layer and/or a polyimide layer are present. Herein, the adjuster is especially described with reference to the three or more layers that are essential for the adjuster, i.e. the first solid material layer, the second solid material layer and one or more layers of switchable birefringent material.

Unless indicated otherwise, and where applicable and technically feasible, the phrase "selected from the group consisting" a number of elements may also refer to a combination of two or more of the enumerated elements. Terms like "below", "above", "top", and "bottom" relate to positions or arrangements of items which would be obtained when the lighting system is arranged substantially flat to, particularly below, a substantially horizontal surface with the lighting system bottom face substantially parallel to the substantially horizontal surface and facing away from the ceiling into the room. However, this does not exclude the use of the lighting system in other arrangements, such as against a wall, or in other (e.g. vertical) arrangements.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Before describing the invention, some designs and uses of optical adjuster as developed (but not yet published) by the applicant will first be described.

Figure 1:
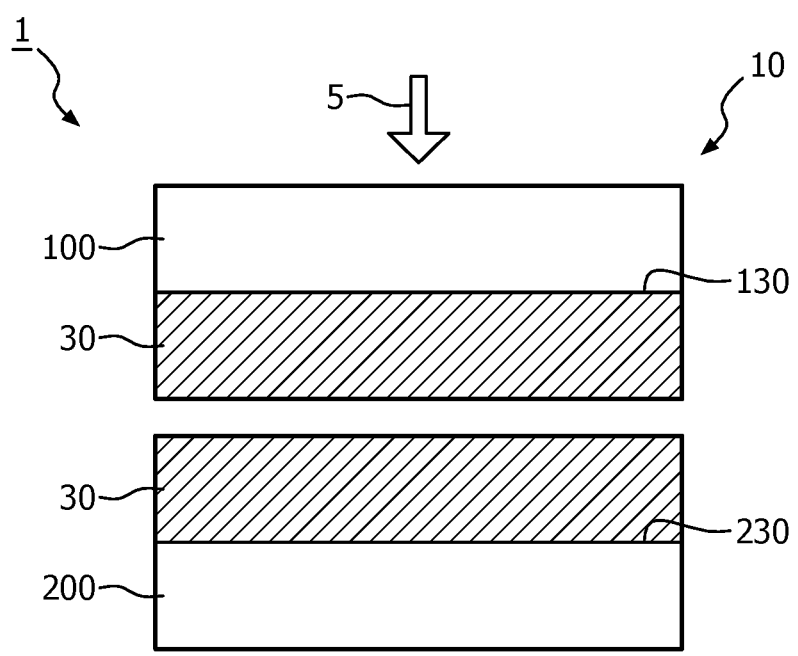
FIG. 1 schematically depicts some principles of the invention.

FIG. 1 schematically depicts an adjuster 1 for adjusting the direction of a light beam 5. The adjuster 1 comprises a stack 10 of layers. The stack 10 comprises a first solid material layer 100 having a first optic axis (not depicted, see FIGS. 2a-4b), a second solid material layer 200 having a second optic axis (not depicted, see FIGS. 2a-4b), and switchable birefringent material 30. The switchable birefringent material may be arranged in a single layer or in separate layers (see below).

For the sake of understanding, polyimide layers and electrode layers such as ITO layers are not drawn in the Figs. Those features are known to the person skilled in the art. The term "adjacent" herein may thus in some embodiments mean that between at least part of adjacent items, for instance a polyimide layer and/or (transparent) ITO layer is present.

The stack further comprises a first interface 130 between the first solid material layer 100 and birefringent material 30 and a second interface 230 between the second solid material layer 200 and birefringent material 30.

The materials of the first material layer 100 and the second material layer 200 as well as the switchable birefringent material are selected and configures that (a) in the off-state, the birefringent material 30 at the first interface 130 is configured to have an optic axis parallel to the first optic axis and the birefringent material 30 at the second interface 230 is configured to have an optic axis parallel to the second optic axis; and (2) in the on-state, the birefringent material 30 at the first interface 130 is configured to have an optic axis perpendicular to the first optic axis and the birefringent material 30 at the second interface 230 is configured to have an optic axis perpendicular to the second optic axis.

The first and the second solid material layers 100,200 preferably comprise solid materials that are birefringent. The switchable birefringent material is preferably liquid crystal, such as twisted nematic liquid crystal or chiral nematic liquid crystal.

Especially, the interfaces 130,230 may comprise one or more microstructures (see below). The external faces of the first and the second material layers are however preferably arranged substantially parallel. These faces are preferably planar, whereas the layers at the interfaces 130,230 with the switchable birefringent material are (thus) preferably substantially non-planar and comprise one or more microstructures (see below).

Figure 2A:
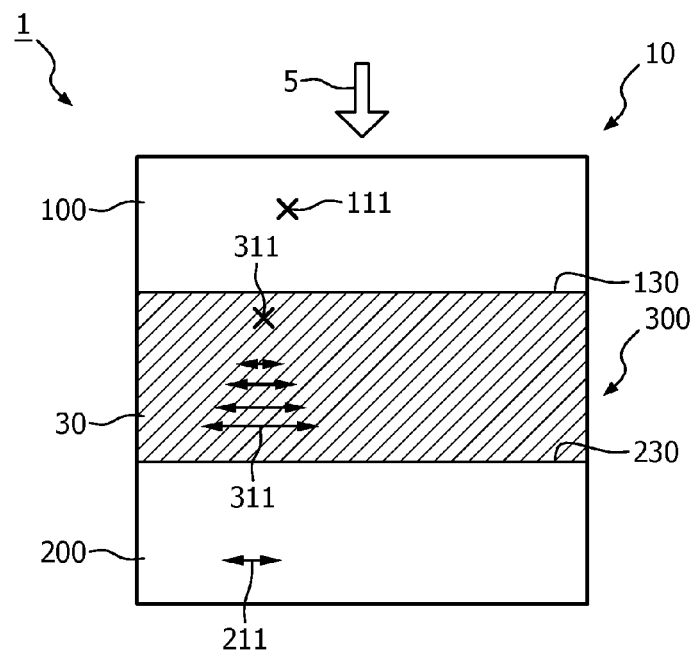
FIGS. 2a-2b schematically depict an embodiment of the adjuster in the "off" and "on" state—this embodiment is used in the display of the invention.
Figure 2B:
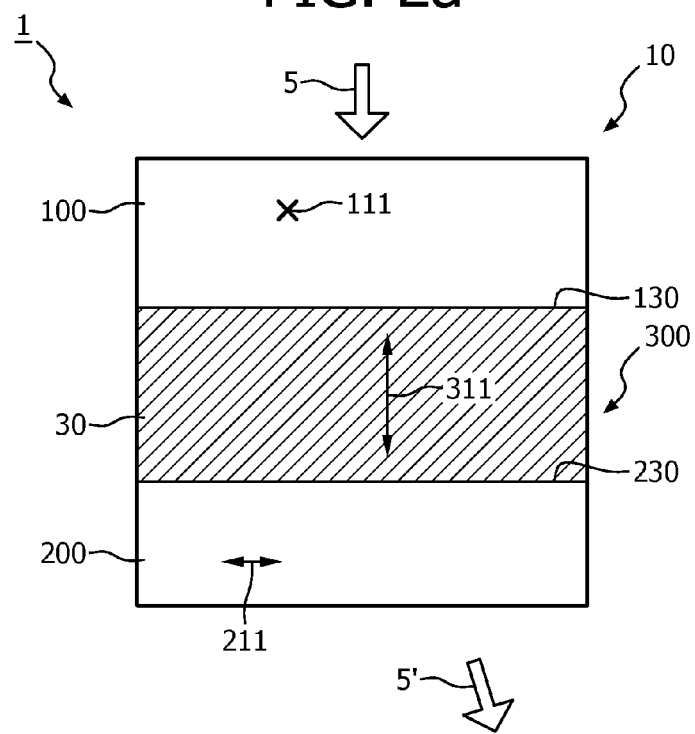

In a specific embodiment, depicted in FIGS. 2a-2b ("off-state" and "on-state", respectively), the stack 10 comprises a stack of the first solid material layer 100, a layer 300 of switchable birefringent material 30, and the second solid material layer 200. The first optic axis, indicated with reference 111, and the second optic axis, indicated with reference 211, are chosen perpendicular. Such adjuster 1 essentially consists of three layers, wherein the first and second solid material layers sandwich the switchable birefringent material. Especially, in such embodiment, the switchable birefringent material 30 comprises twisted nematic liquid crystal material, like such as TL213 from Merck.

The invention involves the use of this type of adjuster within a switchable autostereoscopic display device, as explained further below.

In the off-state, the optic axis (or here optic axes because especially chiral nematic material is applied as switchable birefringent material) of the switchable birefringent material, which optic axis is indicated with reference, 311 at the respective interfaces 130 and 230 are aligned parallel with the optic axes 111 and 211 (of the solid materials at the other side of the respective interfaces). Hence, at the interfaces 130,230 the optic axes are aligned parallel at both sides of the interfaces, respectively. The optic axis of the birefringent material layer may rotate over 90° to obtain the desired configuration of the optic axes in relation to the first and second optic axes 111,211 of the first and second solid materials 100,200.

The layer thickness of the switchable birefringent layer in this embodiment, wherein the birefringent material may comprise twisted nematic LC, may be in the range of about 40-100 μm, such as about 50 μm. Such thickness may be enough to create a 90°, rotation.

When the adjuster 1 is switched on, the alignment of the optic axis of the switchable birefringent material 30 changes, and aligns perpendicular to both the optic axes of the first and second material layers, respectively. Here, the optic axis 311 of the birefringent material, through substantially the entire material, is aligned perpendicular to the optic axes 111,211 of the first and second material layers.

Figure 3A:
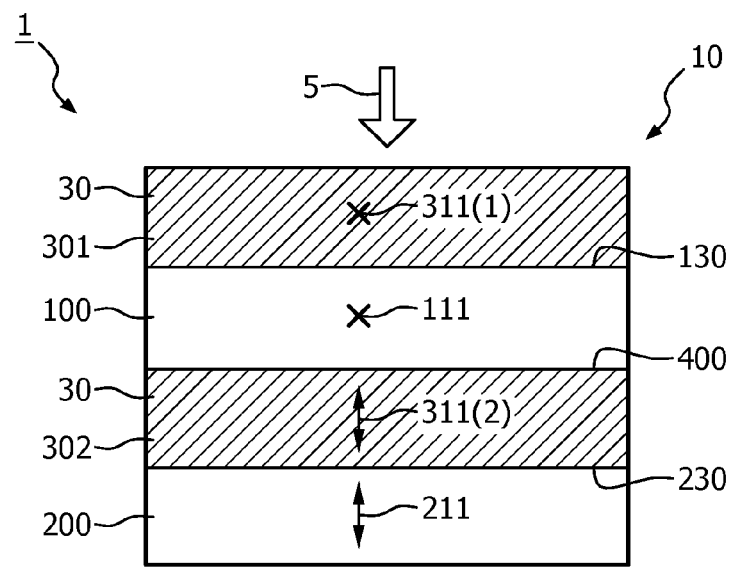
FIGS. 3a-3b schematically depict another embodiment of the adjuster in the "off" and "on" state.
Figure 3B:
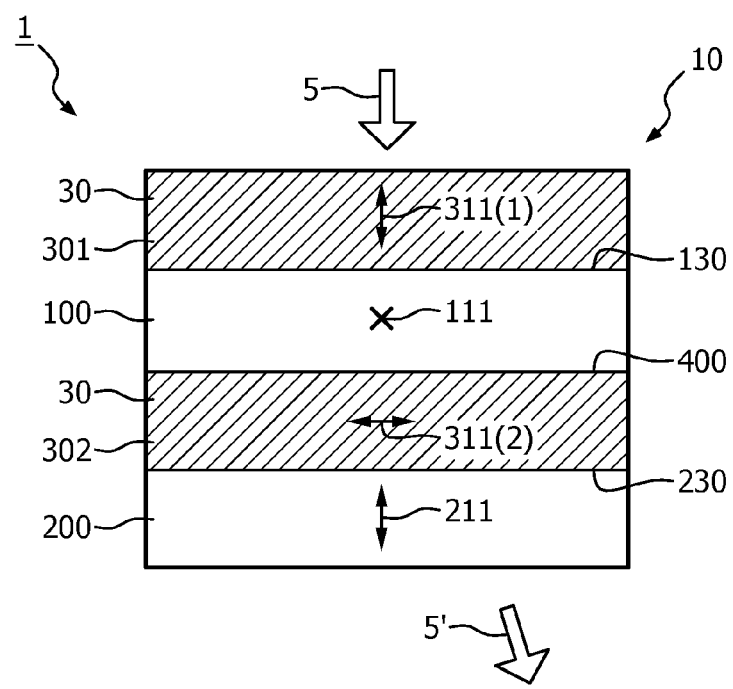

In a further specific embodiment, depicted in FIGS. 3a-3b ("off-state" and "on-state", respectively), the stack 10 comprises a stack 10 of:

a first layer 301 of switchable birefringent material 30;
first solid material layer 100;
a second layer 302 of switchable material 30; and
the second solid material layer 200.

The first layer 301 of switchable birefringent material 30 and the first solid material layer 100 create first interface 130. The second layer 302 of switchable material 30 and the second solid material layer 200 create second interface 230. In fact, this stack 10 comprises 2 cells, i.e. the first layer 301 and the first solid material 100, and the second layer 302 and the second solid material 200. These two cells may be arranged adjacent, i.e. first material 100 and second layer 302 create a further interface 400. This further interface 400 is preferably planar. The optic axis in the respective first and second layers 301,302 of switchable birefringent material 30 are indicated with references 311(1) and 311(2), respectively.

Here, the first optic axis 111 and the second optic axis 211 in this embodiment are perpendicular. The optic axis 311(1) (substantially all over the material of the first layer 301 of switchable birefringent material 30) of the first layer 301 is parallel with the first optic axis 111. The optic axis 311(2) (substantially all over the material of the second layer 302 of switchable birefringent material 30) of the second layer 302 is parallel with the second optic axis 211.

In the off-state, the optic axis 311(1) and 311(2) at the respective interfaces 130 and 230 are thus aligned parallel with the optic axis 111 and 211 of the first solid material layer 100 and the second solid material layer 200, respectively. When the adjuster 1 is switched on, the alignment of the optic axis of the switchable birefringent material 30 changes and aligns perpendicular to both the optic axes of the first and second material layers, respectively, and perpendicular to each other. Referring to FIG. 3b, the optic axis 311(1) of the first layer 301 of switchable birefringent material 30 is perpendicular to the optic axis 111 of the first solid material layer 100 and perpendicular to the optic axis 311(2) of the second layer 302 of switchable birefringent material 30. The optic axis 311(2) of the second layer 302 of switchable birefringent material 30 is perpendicular to the optic axis 211 of the second solid material layer 200 and perpendicular to the optic axis 311(1) of the first layer 301 of switchable birefringent material 30.

Figure 4A:
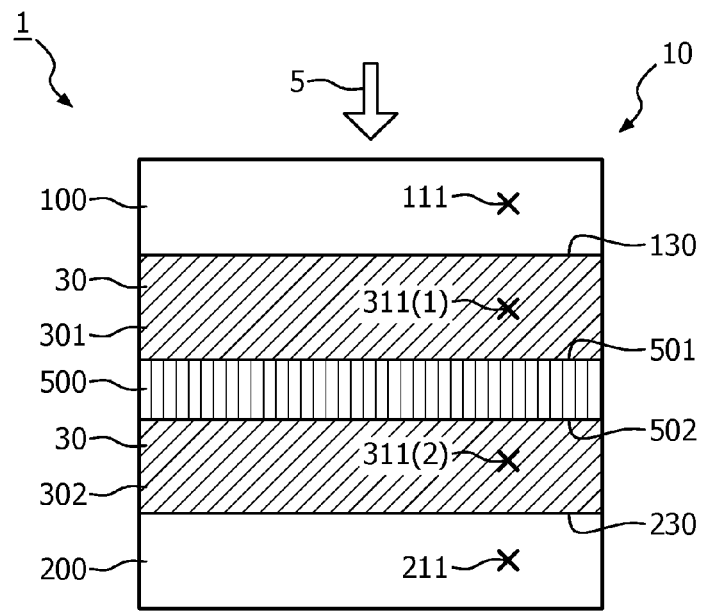
FIGS. 4a-4b schematically depict yet another embodiment of the adjuster in the "off" and "on" state.
Figure 4B:
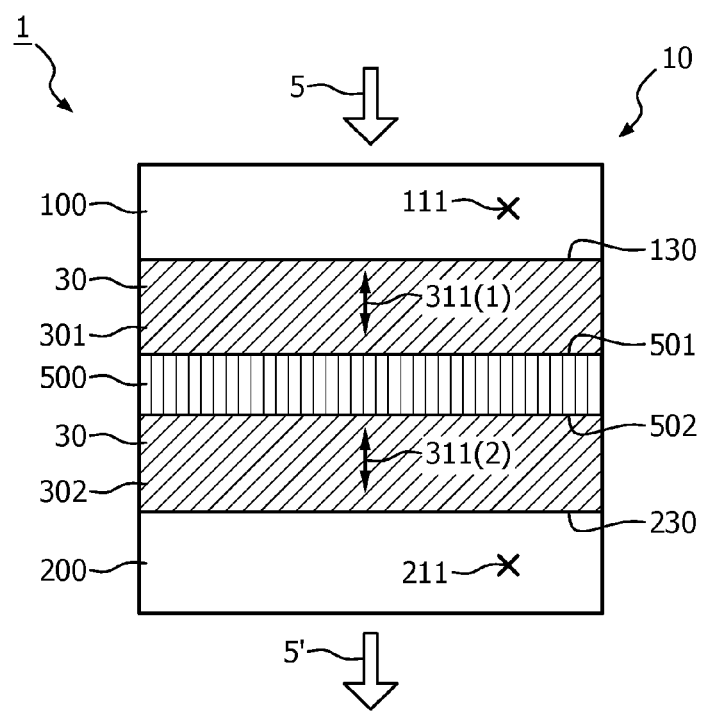

In yet a further specific embodiment, depicted in FIGS. 4a-4b ("off-state" and "on-state", respectively), the stack 10 comprises a stack of the first solid material layer 100;
a first layer 301 of switchable birefringent material 30;
an intermediate layer 500 comprising a polarization rotator, such as a twisted nematic cell;
a second layer 302 of switchable material 30; and
the second solid material layer 200.

The first layer 301 of switchable birefringent material 30 and the first solid material layer 100 create first interface 130. The second layer 302 of switchable material 30 and the second solid material layer 200 create second interface 230.

Here, again, two cells are provided, which cells both comprise a switchable birefringent material and a (birefringent) solid material layer. The optic axes (111/311(1) and 211/311(2)) within the individual cells (100/301 and 200/302, respectively) are aligned parallel. Further, all optic axes may be aligned parallel in the off state.

Between the two cells, the polarization rotator 500 is arranged. The cells may sandwich the polarization rotator 500. In a specific embodiment, the first layer 301 of switchable birefringent material 30 creates an interface 501 with the polarization rotator 500. In a further specific embodiment, the second layer 302 of switchable birefringent material 30 creates an interface 502 with the polarization rotator 500.

In the on-state, the direction of the optic axes of the switchable birefringent material 30 changes for both the first layer 301 and the second layer 302. The optic axes 311(1) and 311(2) swap to a perpendicular state relative to the optic axes 111,211 of the solid material layers 100, 200 respectively. Further, they swap to a state wherein they are mutually parallel. Further, they may swap to a state wherein they are substantially perpendicular to the external face (i.e. substantially parallel to a normal to the stack 1).

Figure 5A:
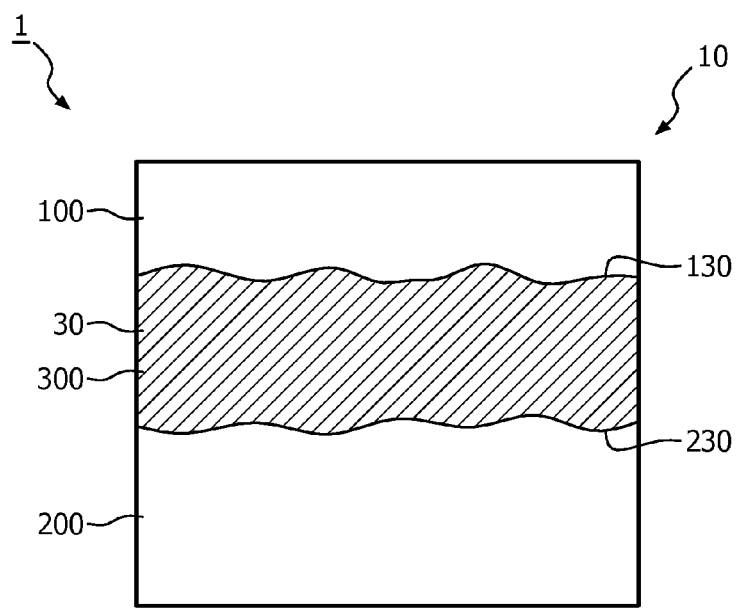
FIGS. 5a-5b schematically depict embodiments of microstructured interfaces.
Figure 5B:
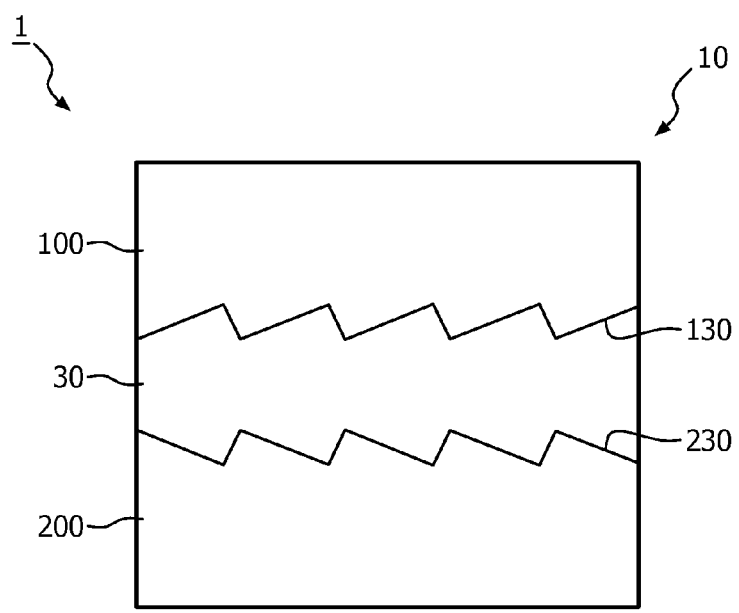

FIGS. 5a-5b non-limitingly depict some embodiments of microstructures on the interfaces 130 and 230. These microstructures are in FIG. 5a lens-shaped, and in FIG. 5b sawtooth shaped. Note that preferably, the microstructures are one-dimensional. Hence, FIGS. 5a/5b may schematically depict cross-sections of embodiments of stack 10.

In some of the embodiments (see for instance FIGS. 1-3), the change in refractive index for the deflected part of the beam passing the first interface in the on-state is opposite in sign with respect to the change of the refractive index of the deflected part of the beam passing the second interface. When demanding the same action at each interface (redirection in a certain direction or focusing, for instance) then for small differences in index, the shapes of the microstructures may substantially be mirror images. One can, however, induce small differences for obtaining an optimal effect. For the embodiment of FIGS. 4a-4b, preferably the interfaces do not comprise microstructures.

Figure 6A:
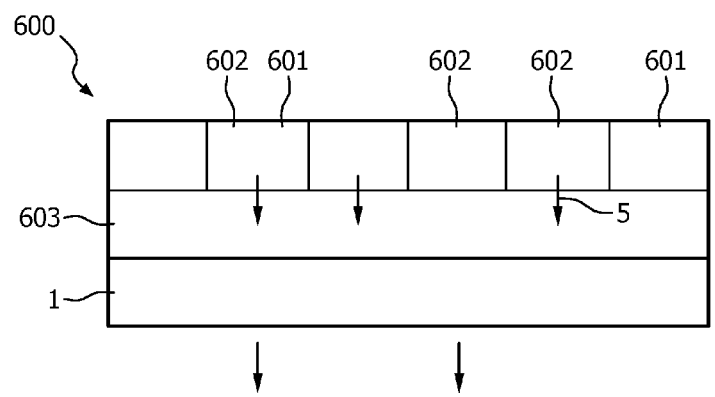
FIGS. 6a-6c schematically depict embodiments of optical devices comprising the adjuster.
Figure 6B:
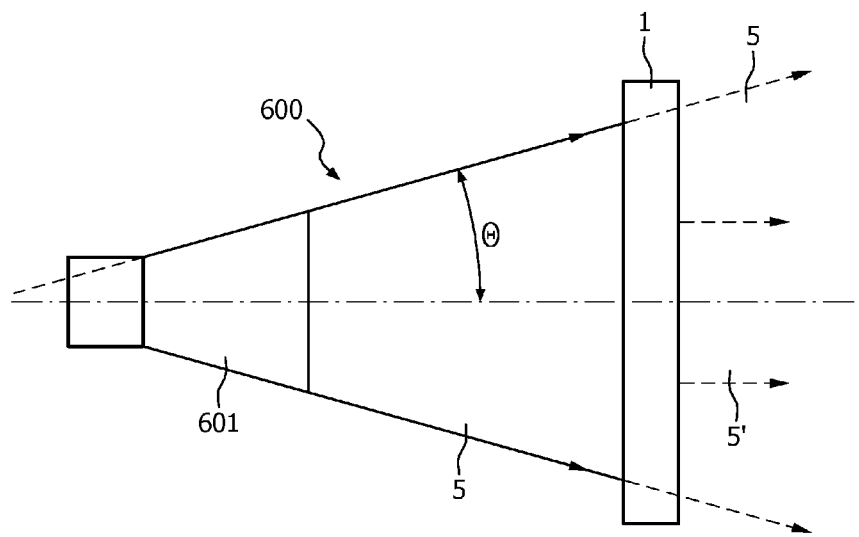

FIGS. 6a-6b schematically depicts embodiments of an optical device 600 comprising the adjuster 1.

The optical device 600 comprises a light source 601 configured to generate a beam of light 5. The optical device 600 further comprises the adjuster 1 for adjusting the direction of a light beam 5. The optical device 600 may be arranged to generate a single beam of light, but may also be configured to generate a plurality of light beams 5.

Here, by way of example, the optical device 600 of FIG. 6a comprises a display device comprising a plurality of pixels 602 as light sources 601. As explained further below, the invention relates specifically to the use of the optical adjuster in an autostereoscopic display device. The adjuster 1 is configured to adjust the directions of the plurality of light beams 5. The plurality of pixels 602 generate the plurality of light beams 5, which may be manipulated by the adjuster 1. In a specific embodiment, the optical device 600 may optionally comprises a plurality of adjusters 1.

In another embodiment, the optical device 600 is an illumination device, see FIG. 6b. Such illumination device may be a lamp, especially a substantially point source lamp, such as a spot light. Hence, in an embodiment, the optical device 600 comprises a spot light as light source 601. Especially, the light source 601 is configured to generate a light beam 5 with an opening angle (2*θ) selected from the range of 2-20°, such as preferably 2-10°. The adjusted beam (or adjusted light beam), downstream of the adjuster 1, when the adjuster 1 is switched on, is indicated with reference 5'.

Figure 6C:
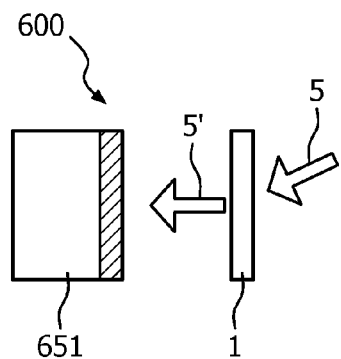

FIG. 6c schematically depicts an embodiment of the optical device 600, wherein the device is arranged to detect light. The optical device 600 comprises an optical sensor 651, such as a CCD array, and the adjuster 1 as described herein. The adjuster may be used to redirect light beams 5 in the direction of the optical sensor. For instance, in this way one may scan or sweep areas.

The adjuster described above is for adjusting the direction of a light beam 5. The adjuster 1 has an off-state and on-state and comprises a stack 10 of layers. The stack 10 comprises a first solid material layer 100 having a first optic axis 111, a second solid material layer 200 having a second optic axis 211, and switchable birefringent material 30. Further, the stack includes a first interface 130 between the first solid material layer 100 and birefringent material 30 and a second interface 230 between the second solid material layer 200 and birefringent material 30. In the off-state, the birefringent material 30 at the first interface 130 is configured to have an optic axis parallel to the first optic axis 111 and the birefringent material 30 at the second interface 230 is configured to have an optic axis parallel to the second optic axis 211. In the on-state, the birefringent material 30 at the first interface 130 is configured to have an optic axis perpendicular to the first optic axis 111 and the birefringent material 30 at the second interface 230 is configured to have an optic axis perpendicular to the second optic axis 211. This device may be used to redirect light beams, for instance for spot lights, display devices or optical sensors.

The use of an adjuster has been described above in connection with devices which are used to redirect optical beams such as spot lights or vehicle headlights. The invention relates specifically to the use of this type of adjuster applied to autostereoscopic display devices.

Autostereoscopic displays can be divided in two groups, one for which glasses are required and one for which this is not required. For the latter, the display sends out angle dependent images. The design is made such that the left and the right eye receive different images and a 3D impression is obtained.

Angle dependent images can be obtained from an LCD-TV with a special backlight or with a lenticular attached to the front of the display. The lenticular comprises an array of cylinder lenses, and projects the LC pixel plane to infinity. In such cases, the lenses transform differences in position to differences in angle. This means that only a selection of pixels can be seen from a certain angle. More different views for more angles leads to a better 3D impression. However, besides giving the 3D impression, more views also automatically reduce the resolution that is seen since all available pixels have been divided among the views: more views means less pixels per view. This leads to a trade-off between resolution and the number of views. A detailed description of one way to construct an autostereoscopic device in terms of design of a solid material (non switchable) lenticular array is described in e.g. U.S. Pat. No. 6,064,424, the contents of which are incorporated by reference. Other ways of designing autostereoscopic display may be used.

A resolution loss may be acceptable for showing 3D content but for displaying 2D content (in which all the views are the same) it is often not acceptable. In order to overcome this issue, several so-called 2D/3D switchable displays have been proposed. These have a fixed lenticular structure that is filled up with a birefringent liquid crystal. By switching the liquid crystal, the lenticular can be switched on and off. A more detailed description of the design and operation of such a device is found in e.g. U.S. Pat. No. 6,069,650, the contents of which are incorporated by reference. Especially the way for providing lens function or transparent function of the lenticular in relation to 2D or 3D mode is described in detail. The described switchable principle in the patent may require the light from the display to be polarized e.g. in case a regular LCD panel is used as the display panel. Such LCD panels are known to provide polarized light in general.

The output of an OLED display is basically unpolarized. In order to apply standard switchable lenticulars, a polarizer is needed in the system for removing the light with the wrong polarization. This will reduce the light output by 50%, giving a loss in brightness or a loss in power efficiency.

Figure 7:
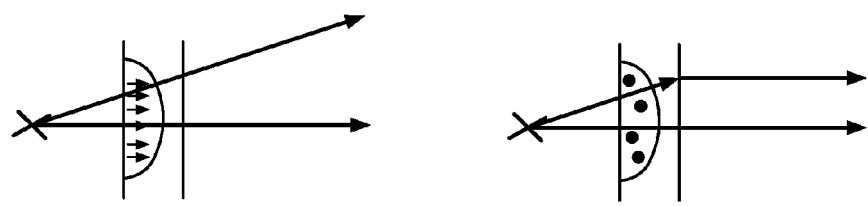
FIG. 7 is used to explain how a switchable lens arrangement can be used for providing a switchable 2D/3D display.

FIG. 7 shows how the switchable lenticular can control the light paths. The left figure shows no lens action while the right figure shows lens action. The orientation of the LC is different in the two Figs. Since the light is polarized, it will encounter in the left figure the ordinary index of refraction which is matched with the replica. Due to this match, there is no lens action. In the right figure, the light will encounter the extra-ordinary index of refraction which is not matched with the replica, giving a lens action.

A problem with this system is that it can only be used for one polarization of the light, making it unsuited for unpolarized OLED displays.

The light adjuster described above can be used to provide a switchable lens function. The interfaces 130,230 become the lenticular lens surfaces.

Figure 8:
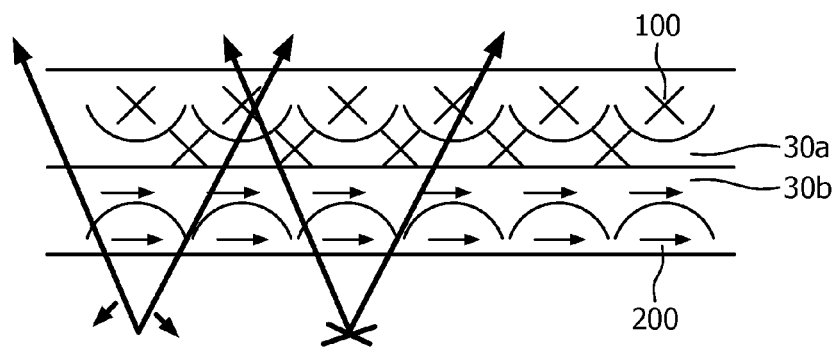
FIG. 8 shows a first example of optical arrangement used in an autostereoscopic display in the 2D mode.
Figure 9:
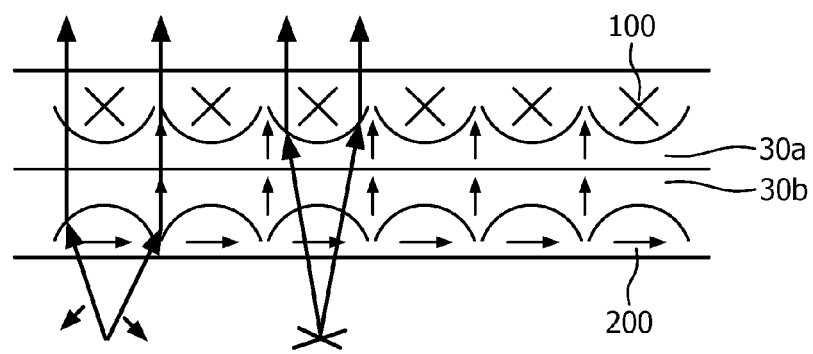
FIG. 9 shows the optical arrangement of FIG. 8 in the 3D mode.

FIGS. 8 and 9 show a first example of implementation of a switchable lenticular arrangement suitable for an unpolarized display output (such as an OLED display) and using the light redirection concept explained above.

FIG. 8 shows the system in the 2D mode. This corresponds to the configuration explained with reference to FIG. 2a, but with separate switchable layers 30a, 30b and the two fixed layers 100, 200.

At the curved lens surfaces there is no difference in optical properties of the materials and therefore no lens action. This will give perfect 2D images.

FIG. 9 shows the system in the 3D mode. This corresponds to the configuration explained with reference to FIG. 2b, but again with separate switchable layers 30a, 30b and the two fixed layers 100, 200. The medium in the middle has switched, and the lower layer 200 refracts one of the polarizations while the layer above 100 switches the other polarization.

The result is that even with an unpolarized light input, the lens action can be turned on and off.

Figure 10:
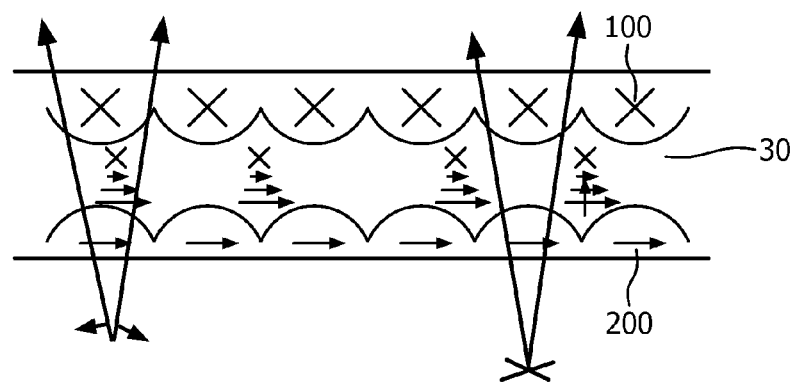
FIG. 10 shows a first example of optical arrangement of the invention for an autostereoscopic display in the 2D mode.
Figure 11:
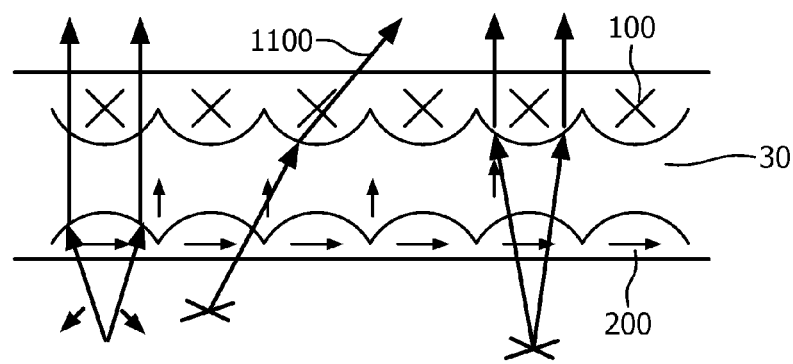
FIG. 11 shows the optical arrangement of FIG. 10 in the 3D mode.

FIGS. 10 and 11 show a first example of implementation of a switchable lenticular arrangement in accordance with the invention, suitable for an unpolarized display output (such as an OLED display) and using the light redirection concept explained above.

FIG. 10 shows the system in the 2D mode. This corresponds even more closely to the configuration explained with reference to FIG. 2a, with a single switchable layer 30 and the two fixed layers 100, 200. This implementation is easier to make from a fabrication point of view. In addition there will be less cross talk.

As described above, the single switchable layer 30 is filled with liquid crystal which rotates the polarization over 90 degrees. Since the optical properties are matched at the interface, no lens action will appear. This is the 2D mode.

FIG. 11 shows the system in the 3D mode. Since the liquid crystal is untwisted in the cell, both polarizations will refract.

There are two potential problems with the design of FIGS. 10 and 11. The first is that the thickness of the switchable LC layer is not well controlled in the center of the lens arrangement. This can lead to artefacts in some circumstances. The second problem is that light going through a certain lens-interface at the lower lenticular may go through another lens-interface at the lenticular above that is shifted by one or more lenses. This leads to cross-talk which can be annoying. This is represented by arrow 1100.

Figure 12:
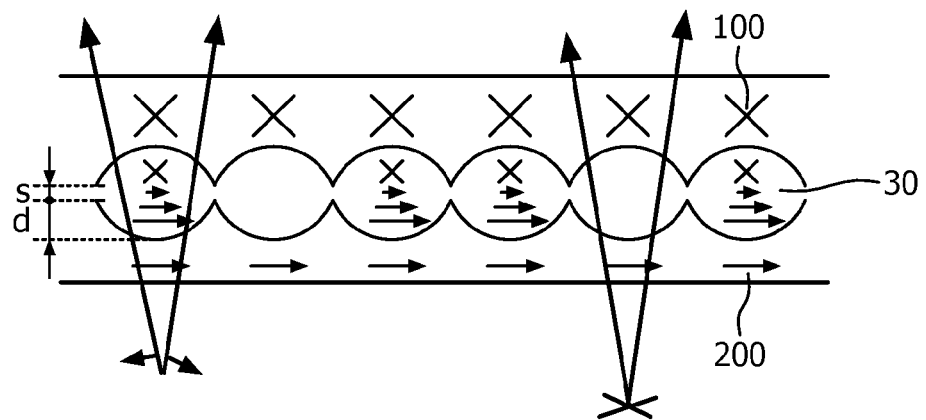
FIG. 12 shows a second example of optical arrangement of the invention for an autostereoscopic display in the 2D mode.
Figure 13:
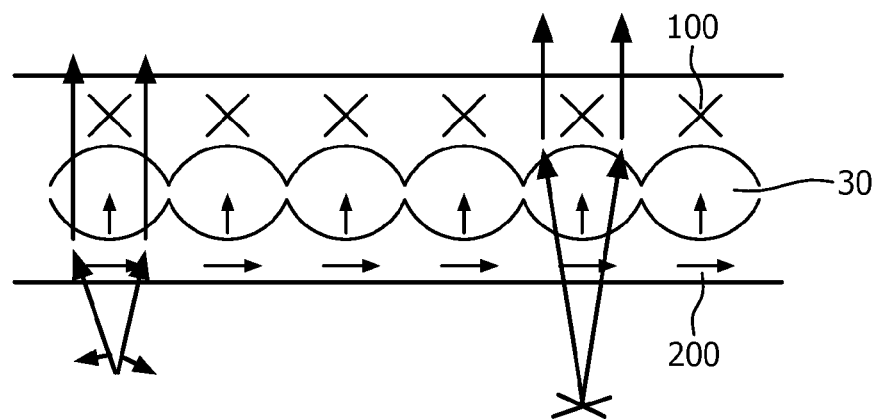
FIG. 13 shows the optical arrangement of FIG. 12 in the 3D mode.

In order to address this issue, the lenticulars can be placed very close to each other such that the sides of the lenses almost touch each other. FIGS. 12 and 13 show a second example in accordance with the invention using this concept. In particular, the minimum spacing between the non-switchable lenses is less than the depth of the lens (with reference to FIG. 12, s<d). Preferably, the minimum spacing s is less than the depth of the lenses of both arrays. The lenses of the two arrays typically have the same depth and pitch (as shown) but this is not essential. This reduction in spacing leads to a reduction of cross-talk.

FIG. 12 shows the 2D mode, and FIG. 13 shows the 3D mode.

In order to make this possible, there are some restrictions on the possible combinations of optical materials. Birefringent materials are often specified with $\Delta n = nE - nO$, where $nE$ is the extra-ordinary index of refraction and $nO$ is the ordinary index of refraction.

For the embodiment of FIGS. 12 and 13, the ordinary index and the extra ordinary index of refraction of the three materials used (two fixed lenticulars and switchable LC) should all be the same. In addition, for the lens shape shown the $\Delta n$ should be negative as well (in order to provide the bending towards the normal in the left part of FIG. 13 for example).

The switching of the liquid crystal can be achieved by combining an alignment layer, suitably positioned electrodes, and suitable type of LC (in particular the $\Delta \epsilon$ property).

Alignment layers can for instance force the LC close to the boundary to orient itself with an angle to the boundary where this angle can for instance be close to zero or 90 degrees. To provide LC alignment along the interface of the lenses, in-plane-switching electrodes can for example be used. These methods are all well-known to those skilled in the art.

The arrangement of layers can be interchanged in the designs above. The two lens arrangements are shown with the same lens pitch, but these may be different. The two fixed lens arrangements can also have different angles if desired. The fixed lenticulars may also be homeotopically aligned In the arrangement described above, two switchable lenticulars each act on perpendicular polarization components of the incident light. The lenticulars are spaced by a switchable non-isotropic medium and the lenticulars themselves are non-isotropic having corresponding optical refractive index properties as the medium between them. This means that both polarizations can be used making the system efficient.

In the drawings, less relevant features like electrical cables, etc. have not (all) been drawn for the sake of clarity.

In the embodiments described above the adjuster is used to create multiple views in such a way that autostereoscopic viewing is enabled. In one example this may be done by designing the lenticulars such that individual pixels of the display panel are projected into the different views. For the detailed description see the US patents referred to here before and the description of the current invention.

The adjuster of the current invention is however equally well suitable for providing a dual-view display where multiple viewers can observe different 2D content. For example the driver/pilot and co-driver/co-pilot of a vehicle or aircraft may be provided by traffic data and non-traffic data such as movie or other, respectively. A detailed description of such displays is provided in e.g. international application PCT/IB03/03844, the content of which is incorporated by reference. The application provides dual view displays having parallax barriers or having lenticular arrays. Without having to repeat the content of that application, the description of the embodiments that relate to the display having a lenticular array in PCT/IB03/03844 provide examples of how to construct a dual view display in terms of relations of pixel dimensions and lenticular design. In order to arrive at a dual view display of the current invention, the lenticular of the display of PCT/IB03/03844 must be replaced with the adjuster of the current invention where the dimensions of the adjuster lenticulars are to be chosen conform the description for the relevant embodiments of the display of PCT/IB03/03844. Furthermore, the LCD display device may be replaced with a display panel that provides substantially unpolarized light such as e.g. an OLED display panel.

The term "substantially" herein, such as in "substantially flat" or in "substantially consists", etc., will be understood by the person skilled in the art. In embodiments the adjective substantially may be removed. Where applicable, the term "substantially" may also include embodiments with "entirely", "completely", "all", etc. Where applicable, the term "substantially" may also relate to 90% or higher, such as 95% or higher, especially 99% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The term "and/or" includes any and all combinations of one or more of the associated listed items. The article "a" or "an" preceding an element does not exclude the presence of a plurality of such elements. The article "the" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A multi-view display comprising:
    an array of pixels, wherein each pixel emits a light;
    a first layer disposed on the multi-view display, wherein the first layer has a first optical axis;
    a second layer, wherein the second layer has a second optical axis;
    a switchable birefringent material disposed between the first layer and the second layer;
    a first interface between the first layer and the switchable birefringent material; and
    a second interface between the second layer and the switchable birefringent material,
    wherein the first interface defines a first array of lenticular lenses, the first array of lenticular lenses having a first depth,
    wherein the second interface defines a second array of lenticular lenses, the second array of lenticular lenses having a second depth,
    wherein the birefringent material has a first state and a second state,
    wherein in the first state, the switchable birefringent material at the first interface is arranged to have a first interface optical axis parallel to the first optical axis and the switchable birefringent material at the second interface is arranged to have a second interface optical axis parallel to the second optical axis,
    wherein in the second state, the switchable birefringent material at the first interface is arranged to have the first interface optical axis perpendicular to the first optical axis and the birefringent material at the second interface is configured to have the second interface optical axis perpendicular to the second optical axis,
    wherein a spacing between the first layer and the second layer is less than the first depth and is less than the second depth.

2. The multi-view display of claim 1,
    wherein the first optical axis and the second optical axis are perpendicular to each other,
    wherein the first optical axis and the second optical axis are oriented in a plane of a surface of the first layer.

3. The multi-view display of claim 1, wherein the light comprises unpolarized light.

4. The multi-view display of claim 1, wherein the pixels comprise organic light emitting diodes.

5. The multi-view display of claim 1, wherein the pixels comprise light emitting diodes.

6. The multi-view display of claim 1,
    wherein the first state configures the multi-view display as a two-dimensional display,
    wherein the second state configures multi-view display as a three-dimensional autostereoscopic display.

7. The multi-view display of claim 1,
    wherein the first state configures the multi-view display device as a single view display, wherein the second state configures the multi-view display device as a multi-view display.

8. The multi-view display of claim 1,
wherein the first layer is a solid material,
wherein the second layer is a solid material.

9. The multi-view display of claim 1, wherein the switchable birefringent material is a twisted nematic liquid crystal material.

10. The multi-view display of claim 1, wherein the switchable birefringent material is a chiral nematic liquid crystal material.

11. A multi-view display comprising:
a display panel, the display panel having pixels, the pixels arranged for generating light beams; and
an adjuster,
wherein the adjuster is arranged for adjusting a direction of the light beams,
wherein the adjuster has an off-state and an on-state, the adjuster comprising:
a first layer having a first optical axis;
a second layer having a second optical axis;
a switchable birefringent material disposed between the first layer and the second layer;
a first interface between the first layer and the switchable birefringent material; and
a second interface between the second solid material layer and the switchable birefringent material,
wherein the first interface a first array of lenticular lenses and the second interface defines a second array of lenticular lenses,
wherein the first array or lenticular lenses and the second array of lenticular lenses are arranged to adjust the direction of the light beams,
wherein in the off-state, the switchable birefringent material at the first interface is configured to have an optical axis parallel to the first optical axis and the switchable birefringent material at the second interface is configured to have an optical axis parallel to the second optical axis;
wherein in the on-state, the switchable birefringent material at the first interface is configured to have an optical axis perpendicular to the first optical axis and the birefringent material at the second interface is configured to have an optical axis perpendicular to the second optical axis.

12. The multi-view display of claim 11,
wherein the first optical axis and the second optical axis are perpendicular to each other,
wherein the first optical axis and the second optical axis are oriented in a plane of a surface of the first layer.

13. The multi-view display of claim 11, wherein the light beams comprises unpolarized light.

14. The multi-view display of claim 11, wherein the pixels comprise organic light emitting diodes.

15. The multi-view display of claim 11, wherein the pixels comprise light emitting diodes.

16. The multi-view display of claim 11, wherein the off-state configures the multi-view display as a two-dimensional display,
wherein the on-state configures multi-view display as a three-dimensional autostereoscopic display.

17. The multi-view display of claim 11,
wherein the off-state configures the multi-view display device as a single view display,
wherein the on-state configures the multi-view display device as a multi-view display.

18. The multi-view display of claim 11, wherein the switchable birefringent material is a twisted nematic liquid crystal material.

19. The multi-view display of claim 11, wherein the switchable birefringent material is a chiral nematic liquid crystal material.

20. A multi-view display comprising:
an array of pixels, wherein each pixel emits a light;
a first layer disposed on the multi-view LED display, wherein the first layer has a first optical axis;
a second layer, wherein the second layer has a second optical axis;
a switchable birefringent material disposed between the first layer and the second layer;
a first interface between the first layer and the switchable birefringent material; and
a second interface between the second layer and the switchable birefringent material,
wherein the first interface defines a first array of prisms, the first array of prisms having a first depth,
wherein the second interface defines a second array of prisms, the second array of prisms having a second depth,
wherein the birefringent material has a first state and a second state,
wherein in the first state, the switchable birefringent material at the first interface is arranged to have a first interface optical axis parallel to the first optical axis and the switchable birefringent material at the second interface is arranged to have a second interface optical axis parallel to the second optical axis,
wherein in the second state, the switchable birefringent material at the first interface is arranged to have the first interface optical axis perpendicular to the first optical axis and the birefringent material at the second interface is configured to have the second interface optical axis perpendicular to the second optical axis,
wherein a spacing between the first layer and the second layer is less than the first depth and is less than the second depth.

* * * * *